(12) United States Patent
Uchibori

(10) Patent No.: US 11,657,628 B2
(45) Date of Patent: May 23, 2023

(54) LOADING DETERMINATION SYSTEM, LOADING DETERMINATION METHOD, AND NON-TRANSITORY STORAGE MEDIUM STORED WITH LOADING DETERMINATION PROCESSING PROGRAM

(71) Applicant: TOYOTA JIDOSHA KABUSHIKI KAISHA, Aichi-ken (JP)

(72) Inventor: Kazuma Uchibori, Kasugai (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 328 days.

(21) Appl. No.: 17/079,522

(22) Filed: Oct. 26, 2020

(65) Prior Publication Data
US 2021/0174058 A1   Jun. 10, 2021

(30) Foreign Application Priority Data
Dec. 6, 2019  (JP) .............................. JP2019-221560

(51) Int. Cl.
| | | |
|---|---|---|
| *G06V 20/64* | (2022.01) | |
| *A45C 7/00* | (2006.01) | |
| *G05D 1/00* | (2006.01) | |
| *G06V 20/13* | (2022.01) | |

(52) U.S. Cl.
CPC .............. *G06V 20/64* (2022.01); *A45C 7/00* (2013.01); *G05D 1/0094* (2013.01); *G06V 20/13* (2022.01)

(58) Field of Classification Search
CPC .......... G06V 20/64; G06V 20/13; A45C 7/00; G05D 1/0094; G06T 7/62; G06Q 10/083
USPC ....................................................... 382/154
See application file for complete search history.

(56) References Cited

U.S. PATENT DOCUMENTS

| | | | | |
|---|---|---|---|---|
| 5,105,392 A | * | 4/1992 | Stringer ................. | G01B 11/04 702/156 |
| 6,044,353 A | * | 3/2000 | Pugliese, III .......... | G06Q 10/08 705/13 |
| 7,899,232 B2 | * | 3/2011 | Gudmundson ...... | G06K 9/6255 356/240.1 |
| 2013/0211864 A1 | * | 8/2013 | Sanderson .............. | B64F 1/366 705/5 |
| 2015/0096813 A1 | * | 4/2015 | Aumente ............... | G01G 19/52 177/245 |

(Continued)

FOREIGN PATENT DOCUMENTS

| | | | | |
|---|---|---|---|---|
| CN | 106144801 A | * | 11/2016 | ........... B66B 1/2408 |
| EP | 3118782 A1 | * | 1/2017 | ........... G06F 3/0481 |

(Continued)

OTHER PUBLICATIONS

Gegov Atanas et al., Method and System for Loading a Motor Vehicle, WO_2015090739_A1_PRT_PAGES.pdf, Jun. 25, 2015, pp. 1-17.*

*Primary Examiner* — Mahendra R Patel
(74) *Attorney, Agent, or Firm* — Hauptman Ham, LLP

(57) ABSTRACT

A loading determination system includes a memory and a processor coupled to the memory. The processor is configured to acquire a dimension of a loading space in a vehicle, acquire image data of luggage to be loaded, compute a dimension of the luggage based on the acquired image data, and determine whether or not loading of the luggage into the loading space is possible by comparing the acquired dimension of the loading space with the computed dimension of the luggage.

12 Claims, 11 Drawing Sheets

(56) References Cited

U.S. PATENT DOCUMENTS

| | | | |
|---|---|---|---|
| 2016/0304299 A1* | 10/2016 | Daun | G06Q 50/28 |
| 2017/0313421 A1* | 11/2017 | Gil | G01B 11/04 |
| | | | 702/156 |
| 2019/0176754 A1 | 6/2019 | Kaneichi et al. | |
| 2019/0182457 A1* | 6/2019 | Kanaoka | G08B 13/14 |
| 2019/0303805 A1 | 10/2019 | Mizutani et al. | |
| 2020/0023811 A1* | 1/2020 | Herman | G01G 19/414 |

FOREIGN PATENT DOCUMENTS

| | | | | |
|---|---|---|---|---|
| EP | 3498545 A1 * | 6/2019 | | B60R 25/01 |
| JP | 2007001724 A * | 1/2007 | | |
| JP | 2015184894 A * | 10/2015 | | B07C 5/04 |
| JP | 2019106057 A | 6/2019 | | |
| JP | 2019179478 A | 10/2019 | | |
| WO | WO-2015052165 A1 * | 4/2015 | | B64F 1/366 |
| WO | WO-2015090739 A1 * | 6/2015 | | B65G 67/00 |
| WO | WO-2020235057 A1 * | 11/2020 | | G06T 17/00 |

\* cited by examiner

LOADING DETERMINATION SYSTEM, LOADING DETERMINATION METHOD, AND NON-TRANSITORY STORAGE MEDIUM STORED WITH LOADING DETERMINATION PROCESSING PROGRAM

CROSS-REFERENCE TO RELATED APPLICATION

This application is based on and claims priority under 35 USC 119 from Japanese Patent Application No. 2019-221560 filed on Dec. 6, 2019, the disclosure of which is incorporated by reference herein.

BACKGROUND

Technical Field

The present disclosure relates to a loading determination system and a loading determination method.

For example, Japanese Patent Application Laid-Open (JP-A) No. 2019-106057 discloses a loading determination system that determines whether or not loading of luggage into a vehicle is possible based on dimensional information relating to a vehicle and the size of the luggage to be loaded that are held in a vehicle loading information database.

However, in the loading determination system disclosed in JP-A No. 2019-106057, it is necessary to register luggage dimensions in a database in advance. There is therefore room for improvement in determining whether or not it is possible to load luggage of unknown dimensions into a vehicle.

SUMMARY

The present disclosure obtains a loading determination system and a program that are capable of determining whether or not it is possible to load luggage of unknown dimensions into a vehicle.

A loading determination system of a first aspect includes a loading space dimension acquisition section configured to acquire a dimension of a loading space in a vehicle, a luggage image acquisition section configured to acquire image data of luggage to be loaded, a luggage dimension computation section configured to compute a dimension of the luggage based on the image data acquired by the luggage image acquisition section, and a determination section configured to determine whether or not loading of the luggage into the loading space is possible by comparing the dimension of the loading space acquired by the loading space dimension acquisition section with the dimension of the luggage computed by the luggage dimension computation section.

In the loading determination system of the first aspect, the dimension of the loading space such as a luggage compartment in the vehicle is acquired by the loading space dimension acquisition section. The image data of the luggage to be loaded is acquired by the luggage image acquisition section. The luggage dimension computation section computes the dimension of the luggage based on the image data of the luggage acquired by the luggage image acquisition section. Employing the image data of the luggage to compute the dimension of the luggage in this manner enables the dimension of the luggage to be easily acquired, even in a case in which the dimension of the luggage to be loaded is not registered in advance.

The determination section determines whether or not loading of the luggage into the loading space is possible by comparing the dimension of the loading space with the dimension of the luggage. A user is thereby able to determine whether or not loading of the luggage is possible simply by checking the determination result of the determination section.

A loading determination system of a second aspect is the first aspect, wherein the loading space dimension acquisition section is configured to acquire the dimension of the loading space from a storage section in which loading space dimensions by vehicle type have been stored in advance.

In the loading determination system of the second aspect, the loading space dimension acquisition section acquires the dimension of the loading space in the corresponding vehicle type by reading vehicle dimension information stored in the storage section.

A loading determination system of a third aspect is the first aspect, wherein the loading space dimension acquisition section is configured to acquire the dimension of the loading space from image data of the loading space captured using an image capture device.

In the loading determination system of the third aspect, the dimension of the loading space can be acquired simply by imaging the loading space using the image capture device.

A loading determination system of a fourth aspect is the third aspect, wherein in a case in which luggage has already been loaded into the loading space, the loading space dimension acquisition section is configured to acquire the dimension of the loading space taking the already-loaded luggage into consideration.

In the loading determination system of the fourth aspect, in a case in which luggage is included in the image data when the loading space is imaged by the image capture device, the loading space dimension acquisition section subtracts a dimension of this luggage from the overall dimension of the loading space to acquire the dimension that is the dimension of the loading space.

A loading determination system of a fifth aspect is any one of the first aspect to the fourth aspect, further including an instruction section configured to instruct a user of a loading location and a loading orientation of the luggage.

In the loading determination system of the fifth aspect, the user is instructed of the loading location and loading orientation of the luggage by the instruction section. This enables the user to easily ascertain how the luggage should be loaded.

A program of a sixth aspect is a program to cause a processor to execute loading determination processing, the loading determination processing includes, acquiring a dimension of a loading space in a vehicle, acquiring image data of luggage to be loaded, computing a dimension of the luggage based on the acquired image data, and determining whether or not loading of the luggage into the loading space is possible by comparing the acquired dimension of the loading space with the computed dimension of the luggage.

In the program of the sixth aspect, the dimension of the loading space such as a luggage compartment in the vehicle is acquired. The image data of the luggage to be loaded is acquired. The dimension of the luggage is computed based on the image data of the luggage acquired. Determination is made as to whether or not loading of the luggage into the loading space is possible by comparing the dimension of the loading space with the dimension of the luggage. Computing the dimension of the luggage using the image data of the luggage in this manner enables the user to determine whether or not loading of the luggage is possible, even in a case in which the dimension of the luggage to be loaded is not registered in advance.

As described above, the loading determination system of the first aspect enables determination to be made as to whether or not it is possible to load luggage of unknown dimensions into the vehicle.

The loading determination system of the second aspect obviates the need for a device or the like to measure the dimension of the loading space.

The loading determination system of the third aspect obviates the need for vehicle information when acquiring the dimension of the loading space.

The loading determination system of the fourth aspect enables determination to be easily made as to whether or not loading of the luggage to be loaded is possible, even in a case in which luggage has already been loaded into the loading space of the vehicle.

The loading determination system of the fifth aspect enables the time needed to load the luggage to be reduced.

The program of the sixth aspect enables determination to made as to whether or not it is possible to load luggage of unknown dimensions into the vehicle.

BRIEF DESCRIPTION OF THE DRAWINGS

Exemplary embodiments of the present invention will be described in detail based on the following figures, wherein.

DETAILED DESCRIPTION

First Exemplary Embodiment

Explanation follows regarding a loading determination system 10 according to a first exemplary embodiment, with reference to the drawings. Note that the loading determination system 10 of the present exemplary embodiment is configured including a portable terminal 12 such as a smartphone.

The loading determination system 10 of the present exemplary embodiment for example enables determination to be made prior to purchasing a product as to whether or not it is possible to load the product into a vehicle on a shopping trip using the vehicle. In the present exemplary embodiment, a dedicated application is pre-installed in the portable terminal 12, and use is enabled by starting up the application.

Hardware Configuration of Loading Determination System 10

Figure 1:
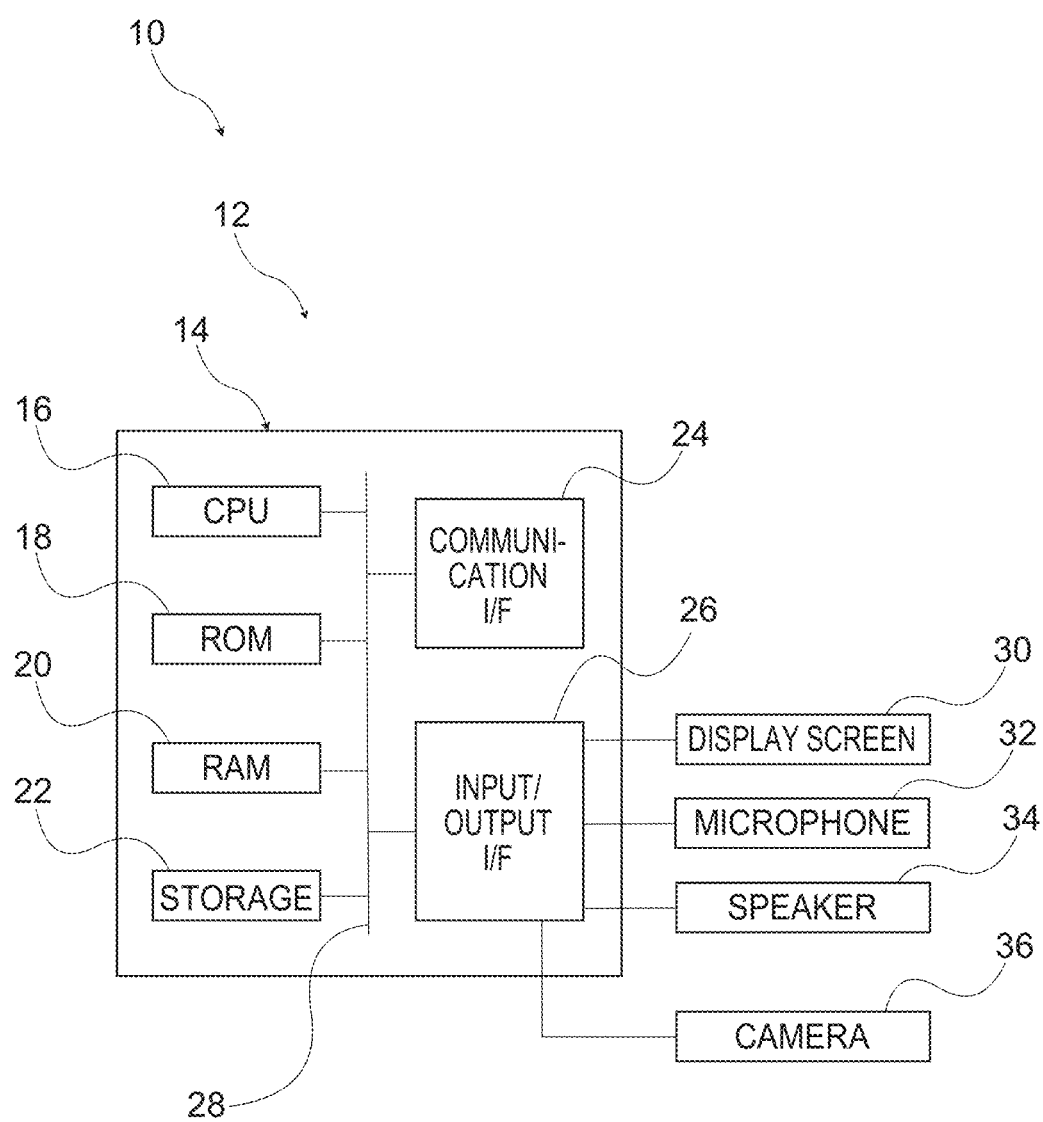
FIG. 1 is a block diagram illustrating a hardware configuration of a loading determination system according to a first exemplary embodiment.

FIG. 1 is a block diagram illustrating a hardware configuration of the loading determination system 10. As illustrated in FIG. 1, a control section 14 is provided in the portable terminal 12. The control section 14 is configured including a central processing unit (CPU) 16, read only memory (ROM) 18, random access memory (RAM) 20, storage 22 serving as a storage section, a communication interface 24, and an input/output interface 26. Each of these configurations are connected together so as to be capable of communicating with each other through a bus 28.

The CPU 16 serves as a processor, and is a central processing unit configured to execute various programs and control various sections. Namely, the CPU 16 reads a program from the ROM 18 as memory or the storage 22 as memory, and executes the program using the RAM 20 as a workspace. The CPU 16 controls the respective configurations mentioned above and performs various computation processing according to the program recorded in the ROM 18 or the storage 22.

The ROM 18 holds various programs and various data. The RAM 20 serves as a workspace for temporary storage of programs and data. The storage 22 is configured by a hard disk drive (HDD) or a solid state drive (SDD), and holds various programs including an operating system, as well as various data. In the present exemplary embodiment, the ROM 18 and the storage 22 hold a program to perform loading determination processing, various data including data relating to loading space in a vehicle, and the like.

The communication interface 24 is an interface employed by the loading determination system 10 to communicate with a non-illustrated server and other devices, and employs a protocol such as Ethernet (registered trademark), LTE, FDDI, or Wi-Fi (registered trademark).

A display screen 30, serving as a display section, a microphone 32, a speaker 34, and a camera 36 are connected to the input/output interface 26. The display screen 30 is provided to the portable terminal 12, and displays various information to a user (see FIG. 4). The display screen 30 also displays image data captured by the camera 36, described later. Note that in the present exemplary embodiment, as an example the display screen 30 is configured by a touch panel, and input can be received by touching content displayed on the display screen 30.

Figure 4:
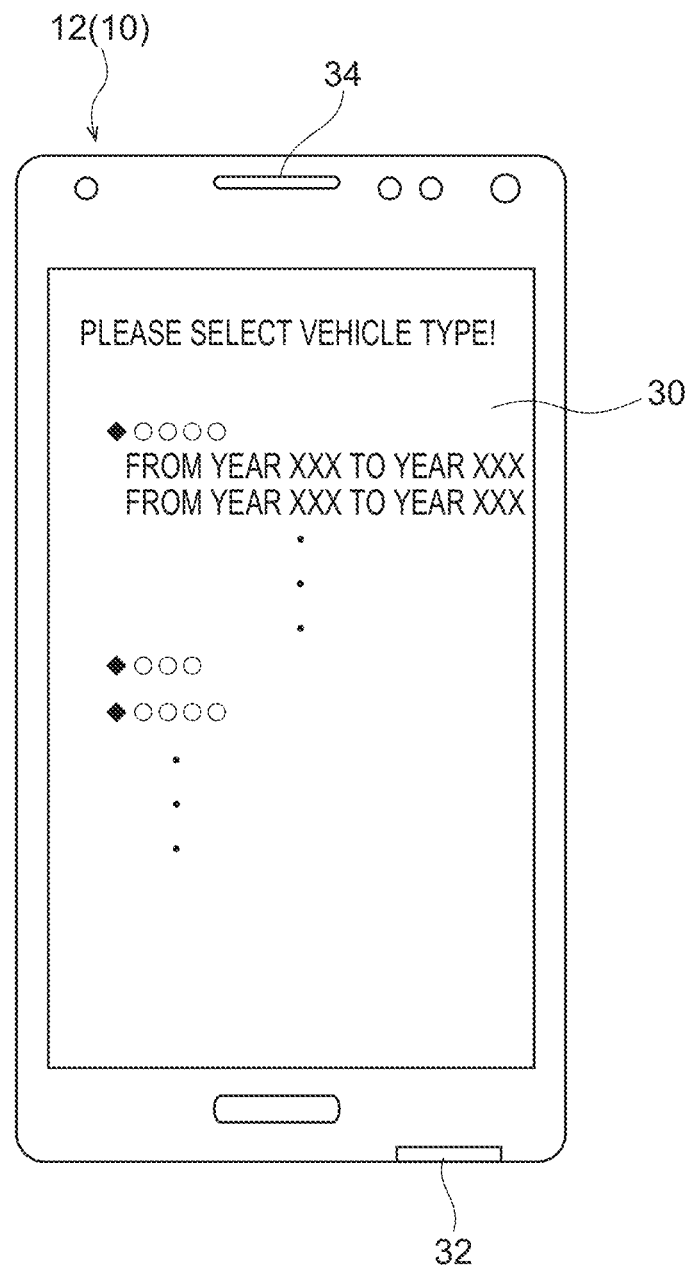
FIG. 4 is a diagram illustrating an example of a display screen of a portable terminal of the first exemplary embodiment when displaying a vehicle type selection screen.

The microphone 32 and the speaker 34 are both provided to the portable terminal 12, and are employed by the user when making calls or the like (see FIG. 4). The user can also employ the microphone 32 to give audio instructions, and the speaker 34 can also be employed to provide audio notifications to the user.

The camera 36 is provided to the portable terminal 12, and image data captured by the camera 36 is displayed on the display screen 30.

Functional Configuration of Loading Determination System 10

The loading determination system 10 implements various functionality by employing the hardware resources described above. Explanation follows regarding functional configurations implemented by the loading determination system 10, with reference to FIG. 2. Note that the respective functional configurations are implemented by the CPU 16 reading and executing a program stored in the storage 22.

Figure 2:
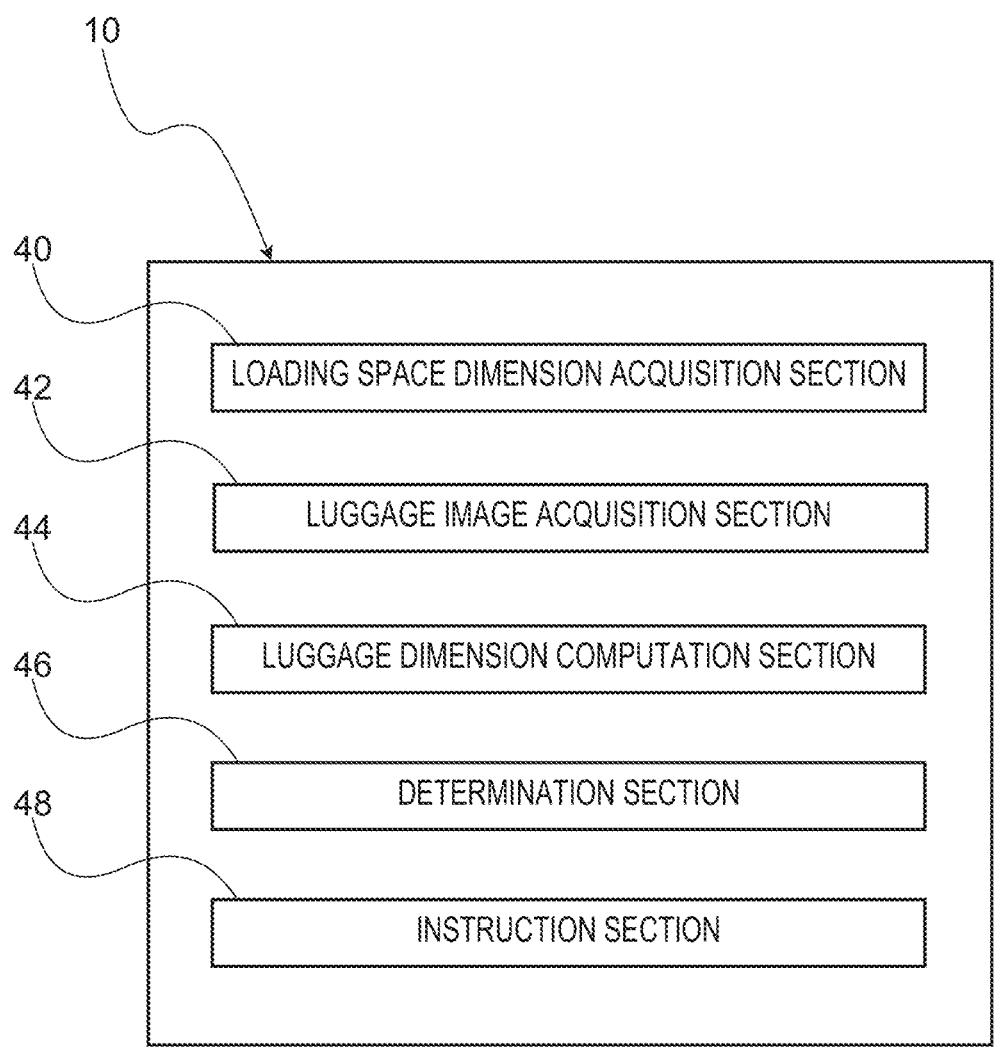
FIG. 2 is a block diagram illustrating a functional configuration of a loading determination system according to the first exemplary embodiment.

As illustrated in FIG. 2, the loading determination system 10 is configured including a loading space dimension acquisition section 40, a luggage image acquisition section 42, a luggage dimension computation section 44, a determination section 46, and an instruction section 48 as functional configurations.

The loading space dimension acquisition section 40 acquires dimensions of a loading space in the vehicle. Specifically, the loading space dimension acquisition section 40 acquires the dimensions of the loading space from the storage 22, in which loading space dimensions by vehicle type have been stored in advance. Namely, the loading space dimension acquisition section 40 acquires the dimensions of the loading space by extracting data relating to loading space dimensions for a given vehicle from the data stored in the storage 22. Note that in the present exemplary embodiment, as an example the user inputs vehicle information by operating the portable terminal 12.

FIG. 4 illustrates an example of the display screen 30 when the user is inputting the vehicle information. As illustrated in FIG. 4, in the present exemplary embodiment, a screen to select the vehicle type and year of the vehicle being used is displayed on the display screen 30 when the application on the portable terminal 12 has been started up. The user can obtain the dimensional information for the loading space of the corresponding vehicle type by selecting the vehicle type of their vehicle from a list.

Note that data relating to loading space dimensions by vehicle type may be stored in a server external to the vehicle. In such cases, the loading space dimension acquisition section 40 uses the communication interface 24 to acquire the dimensional information for the loading space for a specific vehicle type from this server. Alternatively, the user may use the microphone 32 of the portable terminal 12 to input the vehicle type, year, and so on of the vehicle by audio.

As illustrated in FIG. 2, the luggage image acquisition section 42 acquires image data of the luggage to be loaded. Specifically, the luggage image acquisition section 42 guides the user to take a photograph of the luggage to be loaded using the camera 36, and acquires captured image data as image data of the luggage to be loaded.

Figure 5:
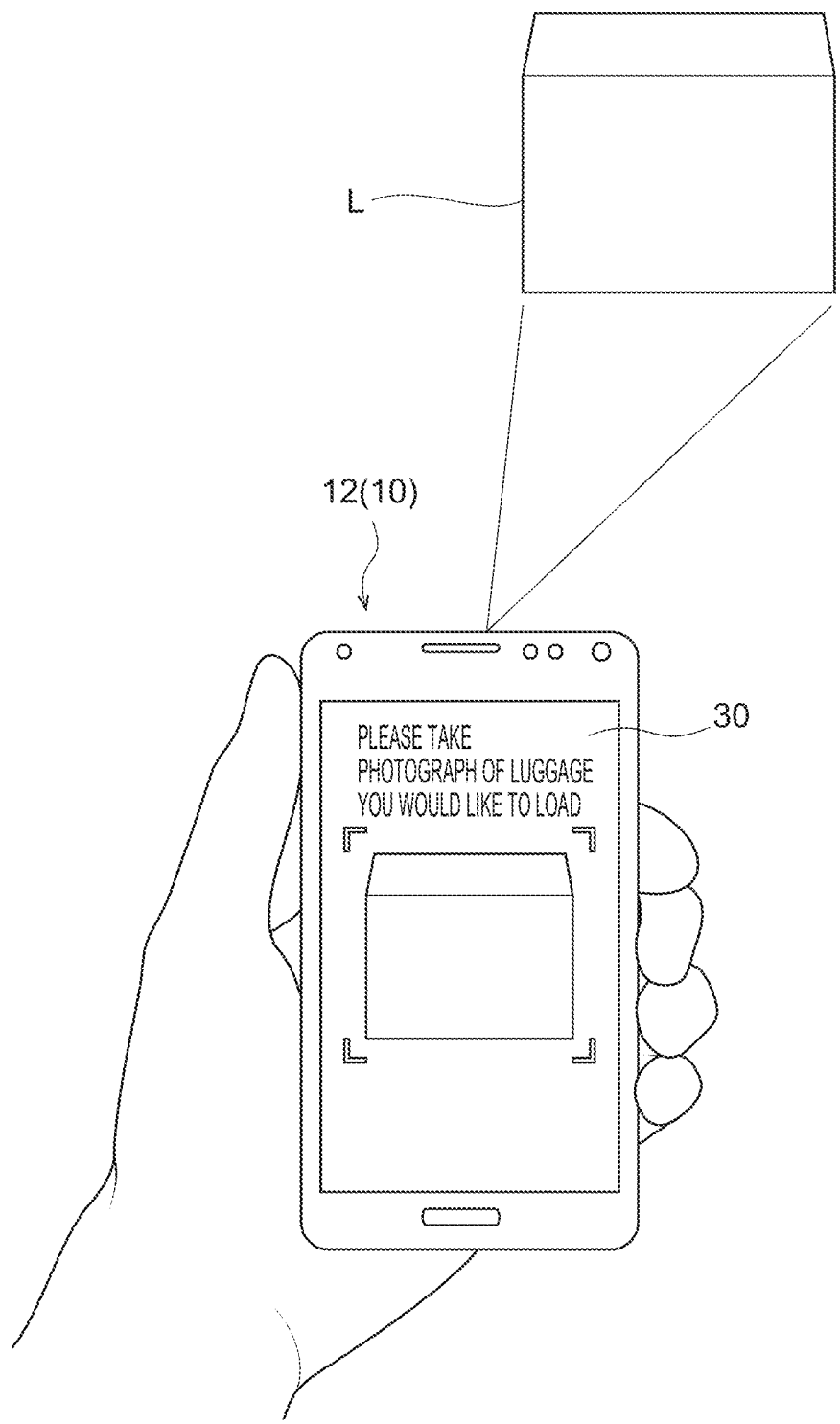
FIG. 5 is a diagram to explain a method of capturing an image of luggage in the first exemplary embodiment.

FIG. 5 illustrates an example of a display screen 30 when the user is to take a photograph of luggage L to be loaded. As illustrated in FIG. 5, in the present exemplary embodiment a text instruction to take a photograph of the luggage L to be loaded is displayed on the display screen 30 as an example. Note that audio may be output from the speaker 34 to instruct the user using audio.

As illustrated in FIG. 2, the luggage dimension computation section 44 computes the dimensions of the luggage L based on the image data of the luggage L acquired by the luggage image acquisition section 42. Various methods may be employed as the method for computing the dimensions of the luggage L from the image data. For example, parallax may be employed to compute the dimensions of the luggage L based on the principle of triangulation. Alternatively, the dimensions of the luggage L may be computed by photographing a reference object or the like of known dimensions together with the luggage L. In the present exemplary embodiment, as an example, employing image data captured from an oblique upper side enables dimensions to be computed in a lengthwise direction, a widthwise direction, and a height direction. Note that in a case in which the shape of the luggage L cannot be detected from the image data of the luggage L acquired by the luggage image acquisition section 42, text may be displayed to indicate that the luggage L has not been captured correctly.

As illustrated in FIG. 2, the determination section 46 compares the dimensions of the loading space acquired by the loading space dimension acquisition section 40 against the dimensions of the luggage L computed by the luggage dimension computation section 44 in order to determine whether or not it is possible to load the luggage L into the loading space. Specifically, a width direction dimension of the loading space is compared against the widthwise direction dimension of the luggage L, and a depth direction dimension of the loading space is compared against the lengthwise direction dimension of the luggage L. The height of the loading space is also compared against the height direction dimension of the luggage L. In a case in which the respective dimensions of the luggage L are smaller than the dimensions of the loading space, determination is made that it is possible to load the luggage L into the loading space. Likewise, in a case in which the respective dimensions of the luggage L are smaller than the dimensions of the loading space if the length and width of the luggage L are reversed, determination is made that it is possible to load the luggage L into the loading space. Note that in the present exemplary embodiment, as an example, in a case in which the luggage L has a shape other than a cube or rectangular shape, loading is determined to be possible in a case in which the largest dimension of the three directions of the luggage L is smaller than the dimensions of the loading space.

Figure 6:
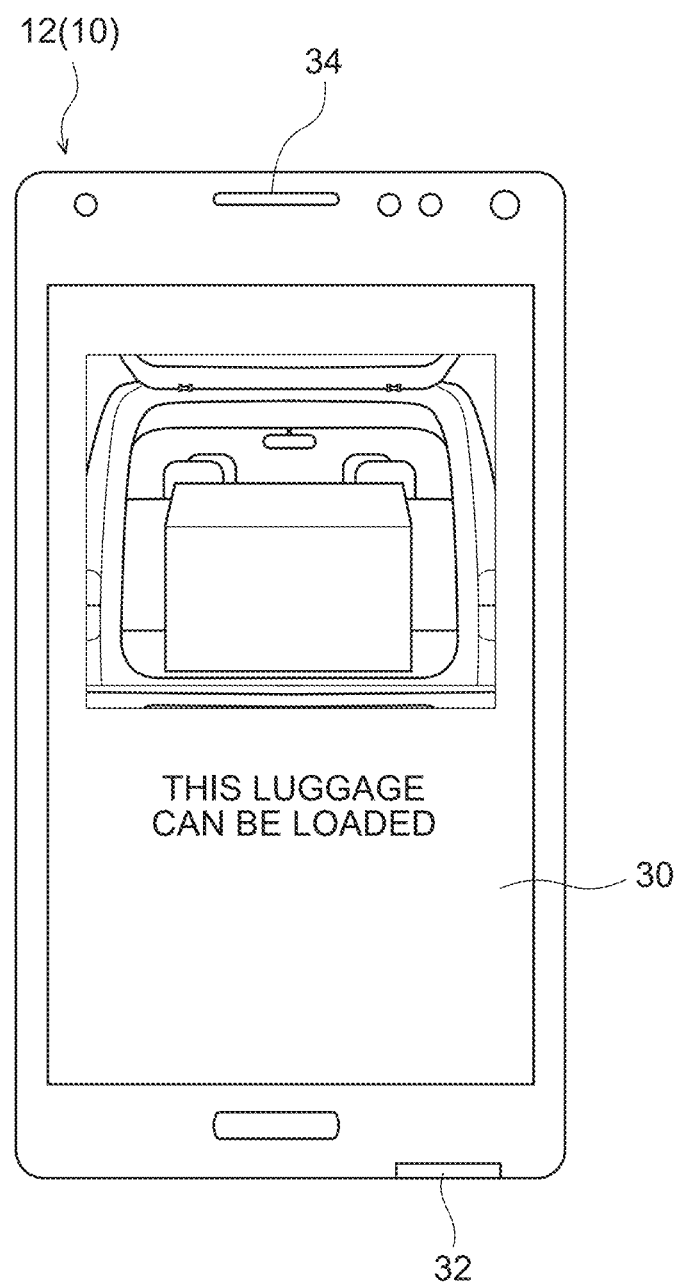
FIG. 6 is a diagram illustrating an example of a display screen of a portable terminal of the first exemplary embodiment when displaying a determination result screen.

As illustrated in FIG. 2, the instruction section 48 instructs the user of a loading location and a loading orientation of the luggage L. FIG. 6 illustrates an example of the display screen 30 of the portable terminal 12 displayed by the instruction section 48. As illustrated in FIG. 6, the display screen 30 displays the image data of the luggage L photographed by the user in a state overlaid on an image of the loading space of the vehicle. The display screen 30 also displays text indicating that loading of the luggage L is possible.

Operation

Explanation follows regarding operation of the present exemplary embodiment.

Loading Determination Processing

Figure 3:
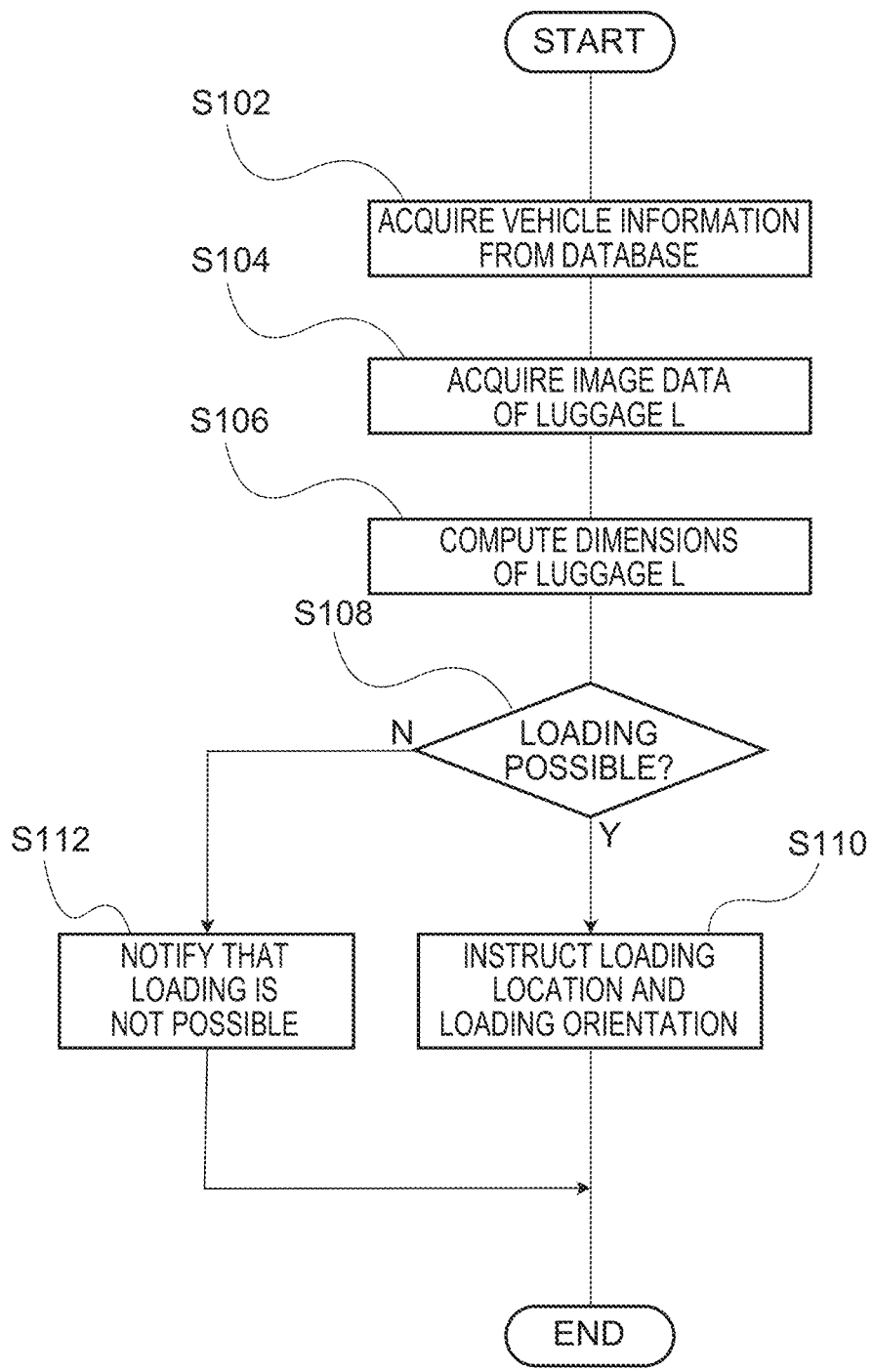
FIG. 3 is a flowchart illustrating an example of a flow of loading determination processing of the first exemplary embodiment.

Explanation follows regarding an example of loading determination processing to determine whether or not loading of luggage is possible, with reference to the flowchart illustrated in FIG. 3. This loading determination processing is executed by the CPU 16 reading the program from the ROM 18 or the storage 22, and expanding and executing the program in the RAM 20.

As illustrated in FIG. 3, at step S102, the CPU 16 acquires the vehicle information from the database (a loading space dimension acquisition step). In the present exemplary embodiment, the dimensions of the loading space of the vehicle and the number of vehicle occupants are acquired as the vehicle information. Specifically, when the user follows the guidance of the portable terminal 12 to select the vehicle type and year of the vehicle they are using, and the CPU 16 acquires the dimensional information regarding the loading space corresponding to the vehicle selected by the user from the database using the functionality of the loading space dimension acquisition section 40.

Next, at step S104, the CPU 16 acquires image data of the luggage L (a luggage image acquisition step). Specifically, the CPU 16 guides the user to take a photograph of the luggage to be loaded using the camera 36, and acquires the captured image data as the image data of the luggage L to be loaded using the functionality of the luggage image acquisition section 42 (see FIG. 5).

The CPU 16 then computes the dimensions of the luggage L at step S106 (a luggage dimension computation step). Specifically, the CPU 16 computes the dimensions of the luggage L based on the image data of the luggage L acquired at step S104 using the functionality of the luggage dimension computation section 44. The CPU 16 then transitions to the processing of step S108.

At step S108, the CPU 16 determines whether or not it is possible to load the luggage L into the loading space (a determination step). Specifically, the CPU 16 determines whether or not it is possible to load the luggage L into the loading space by comparing the dimensions of the loading space acquired at step S102 against the dimensions of the luggage L computed at step S106 using the functionality of the determination section 46. When this is performed, in vehicles provided with rear seats, in a case in which the number of vehicle occupants input at step S102 is one or two, determination may be made as to whether or not it is possible to load the luggage L by folding down the rear seats so as to increase the loading space. Alternatively, in vehicles provided with three rows of seats, in a case in which the number of vehicle occupants is fewer than five, determination may be made as to whether or not it is possible to load the luggage L by folding down the third row of seats so as to increase the loading space.

In a case in which loading of the luggage L is determined to be possible at step S108, the CPU 16 transitions to the processing of step S110. In a case in which determination is made that the luggage L cannot be loaded, the CPU 16 transitions to the processing of step S112.

At step S110, the CPU 16 instructs the loading location and loading orientation of the luggage L. Specifically, the CPU 16 displays the image data of the luggage L on the display screen 30 of the portable terminal 12 in a state overlaid on an image of the loading space of the vehicle using the functionality of the instruction section 48 in order to instruct the loading location and loading orientation of the luggage L (see FIG. 6). The CPU 16 then ends the loading determination processing.

In a case in which the luggage L cannot be loaded, the CPU 16 notifies that loading is not possible at step S112. Specifically, the CPU 16 notifies the user by displaying text to the effect that loading cannot be performed on the display screen 30 of the portable terminal 12. Note that the CPU 16 may display a symbol such as a cross mark on the display screen 30 so as to make it apparent at a glance that loading cannot be performed. Alternatively, the user may be notified using audio to the effect that loading cannot be performed, or audio notification may be performed alongside display on the display screen 30. The CPU 16 then ends the loading determination processing.

As described above, in the loading determination system 10 according to the present exemplary embodiment, employing the image data of the luggage L to compute the dimensions of the luggage L enables determination to be made as to whether or not it is possible for the user to load the luggage L, even in a case in which the dimensions of the luggage L to be loaded are not registered in advance. Namely, determination can be made as to whether or not loading of the luggage L into the vehicle is possible for luggage L of unknown dimensions.

In the present exemplary embodiment, the dimensions of the loading space are acquired by reading the dimensional information for the vehicle that is stored in the storage 22 using the functionality of the loading space dimension acquisition section 40. There is therefore no need for a device or the like to measure the dimensions of the loading space.

Moreover, in the present exemplary embodiment, the user is instructed of the loading location and loading orientation of the luggage L using the functionality of the instruction section 48. This enables the user to easily ascertain how the luggage L should be loaded. This enables the time needed to load the luggage L to be reduced.

Second Exemplary Embodiment

Explanation follows regarding a loading determination system 50 according to a second exemplary embodiment, with reference to the drawings. Note that configurations similar to those of the first exemplary embodiment are allocated the same reference numerals, and explanation thereof is omitted as appropriate. Note that the hardware configuration of the loading determination system 50 of the present exemplary embodiment is similar to that of the first exemplary embodiment (see FIG. 1).

Functional Configuration of Loading Determination System 50

Figure 7:
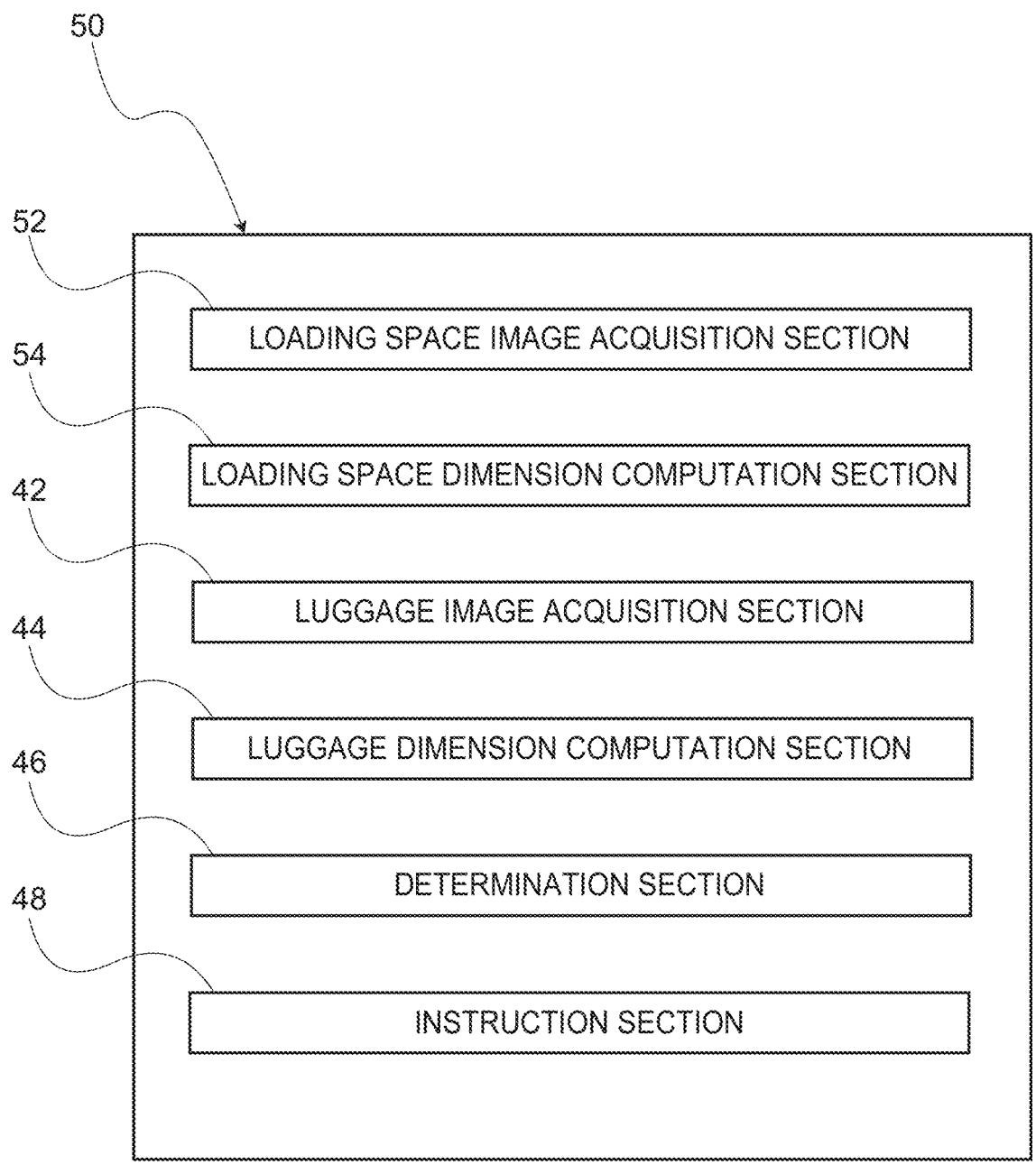
FIG. 7 is a block diagram illustrating a functional configuration of a loading determination system according to a second exemplary embodiment.

Explanation follows regarding functional configuration implemented by the loading determination system 50, with reference to FIG. 7. Note that the respective functional configurations are implemented by the CPU 16 reading and executing a program stored in the storage 22.

As illustrated in FIG. 7, the loading determination system 50 is configured including a loading space image acquisition section 52, a loading space dimension computation section 54, the luggage image acquisition section 42, the luggage dimension computation section 44, the determination section 46, and the instruction section 48 as functional configuration. Namely, the loading space image acquisition section 52 and the loading space dimension computation section 54 are provided instead of the loading space dimension acquisition section 40 of the first exemplary embodiment, and the loading space dimension computation section 54 corresponds to a loading space dimension acquisition section of the present disclosure.

The loading space image acquisition section 52 acquires image data of the loading space of a vehicle V into which the luggage L is to be loaded. Specifically, the loading space image acquisition section 52 guides the user to take a photograph of the loading space using the camera 36, and acquires the captured image data as image data of the loading space.

Figure 9:
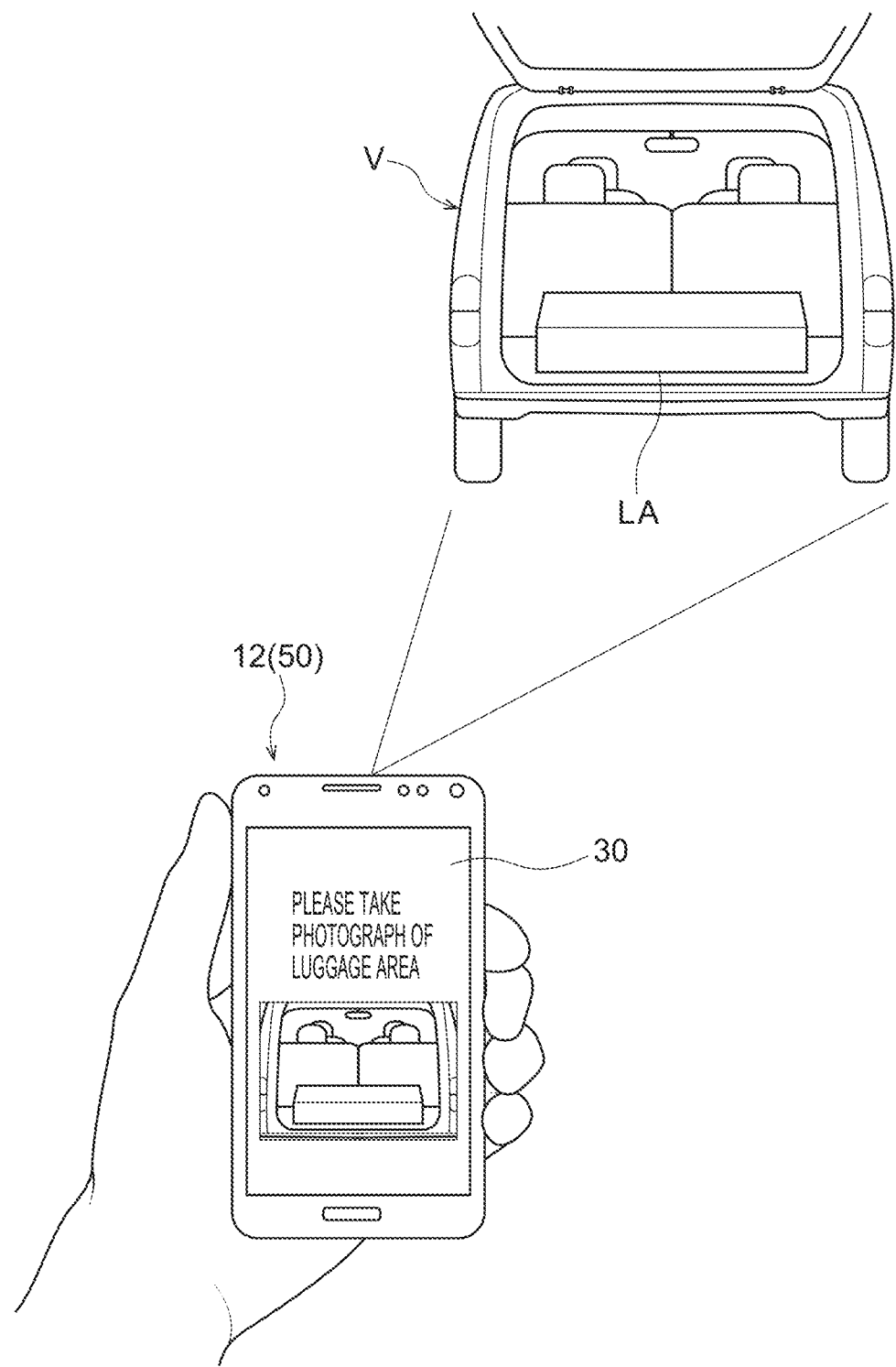
FIG. 9 is a diagram to explain a method of capturing an image of a loading space in the second exemplary embodiment.

FIG. 9 illustrates an example of the display screen 30 when the user takes a photograph of the loading space of the vehicle V. As illustrated in FIG. 9, in the present exemplary embodiment, a text instruction to take a photograph of the luggage area, this being the loading space, is displayed on the display screen 30 as an example. Note that audio may be output from the speaker 34 to instruct the user using audio.

As illustrated in FIG. 7, the loading space dimension computation section 54 computes the dimensions of the loading space based on the image data of the loading space acquired by the loading space image acquisition section 52. Note that the method for computing the dimensions of the loading space from the image data may employ a similar method to that of the luggage dimension computation section 44 described above.

As illustrated in FIG. 9, in a case in which luggage LA is included in the image data of the loading space acquired by the loading space image acquisition section 52, namely in a case in which the other luggage LA has already been loaded, the dimensions of the loading space are computed so as to take the luggage LA into consideration. Namely, the loading space dimension computation section 54 computes the overall dimensions of the loading space, and then subtracts the dimensions of the luggage LA from the overall dimensions in order to obtain the dimensions that are the dimensions of the loading space.

The determination section 46 compares the dimensions of the loading space computed by the loading space dimension computation section 54 against the dimensions of the luggage L computed by the luggage dimension computation section 44 to determine whether or not it is possible to load the luggage L into the loading space. Specifically, in a case in which the respective dimensions of the luggage L are smaller than the dimensions of the loading space, determination is made that it is possible to load the luggage L into the loading space. Likewise, in a case in which the respective dimensions of the luggage L are smaller than the dimensions of the loading space if the length and width of the luggage L are reversed, determination is made that it is possible to load the luggage L into the loading space. Note that as an example in the present exemplary embodiment, in a case in which the luggage L has a shape other than a cube or rectangular shape, loading is determined to be possible in a case in which the largest dimension of the three directions of the luggage L is smaller than the dimensions of the loading space.

Figure 10:
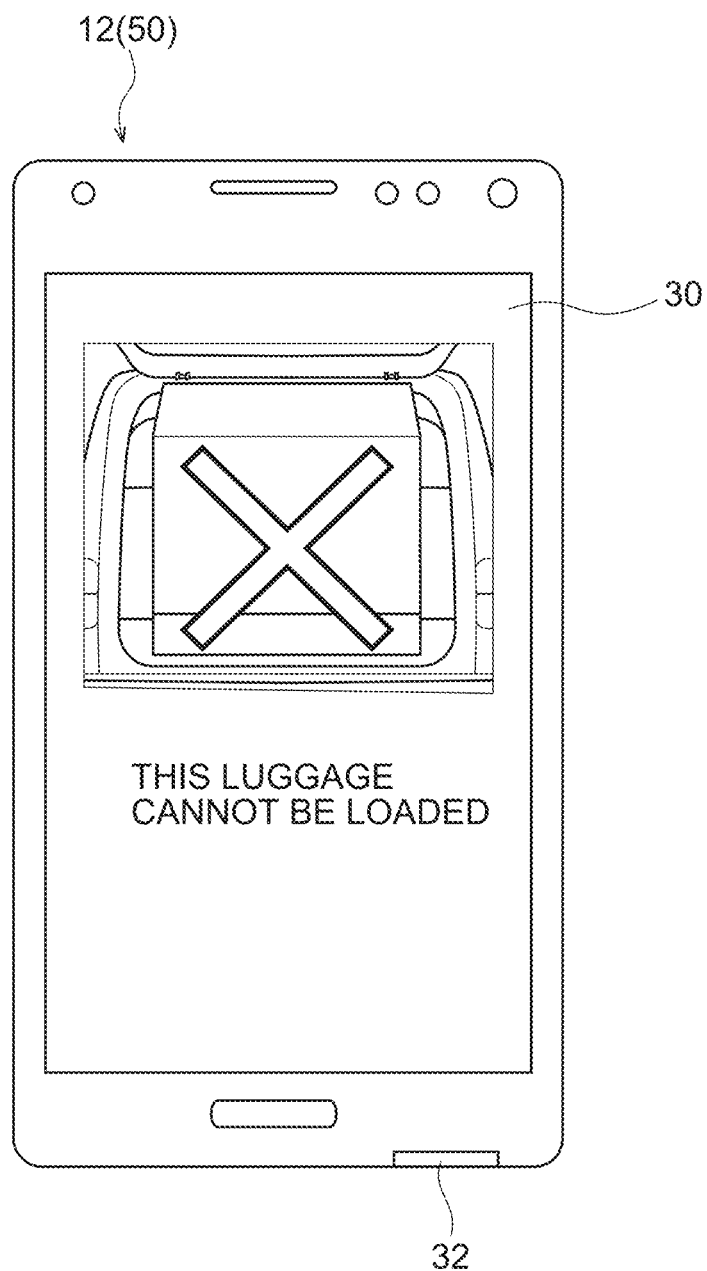
FIG. 10 is a diagram illustrating an example of a display screen of a portable terminal of the second exemplary embodiment when displaying a determination result screen.

In a case in which the determination section 46 determines that the luggage L cannot be loaded into the loading space, as illustrated in FIG. 10, text to the effect that loading of the luggage L is not possible is displayed on the display screen 30 of the portable terminal 12. In the present exemplary embodiment, the image data of the luggage LA is displayed overlaid on the loading space with a cross mark as an example, thus enabling the user to confirm at a glance that the luggage L cannot be loaded.

Figure 11:
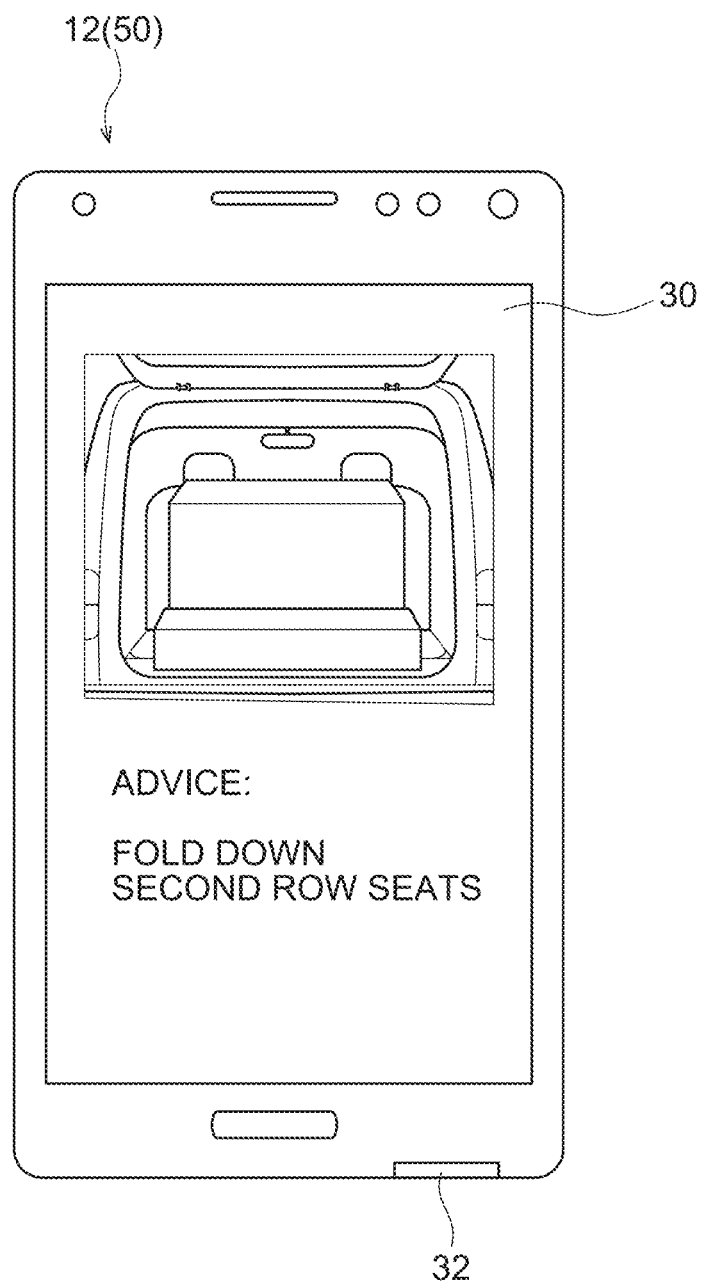
FIG. 11 is a diagram illustrating an example of a display screen of a portable terminal of the second exemplary embodiment when displaying a loading method instruction screen.

In a case in which loading of the luggage L is possible, the instruction section 48 instructs the user of the loading location and loading orientation of the luggage L. In a case in which loading of the luggage L into the loading space is not possible, the instruction section 48 advises a method of loading the luggage L, as illustrated in FIG. 11. In FIG. 11, since it is possible to load the luggage L by folding down the second row seats, an instruction to fold down the second row seats is displayed on the display screen 30. Moreover, the luggage LA is displayed on the display screen 30 in a state placed on top of the second row seats that have been folded down.

Operation

Explanation follows regarding operation of the present exemplary embodiment.

Loading Determination Processing

Figure 8:
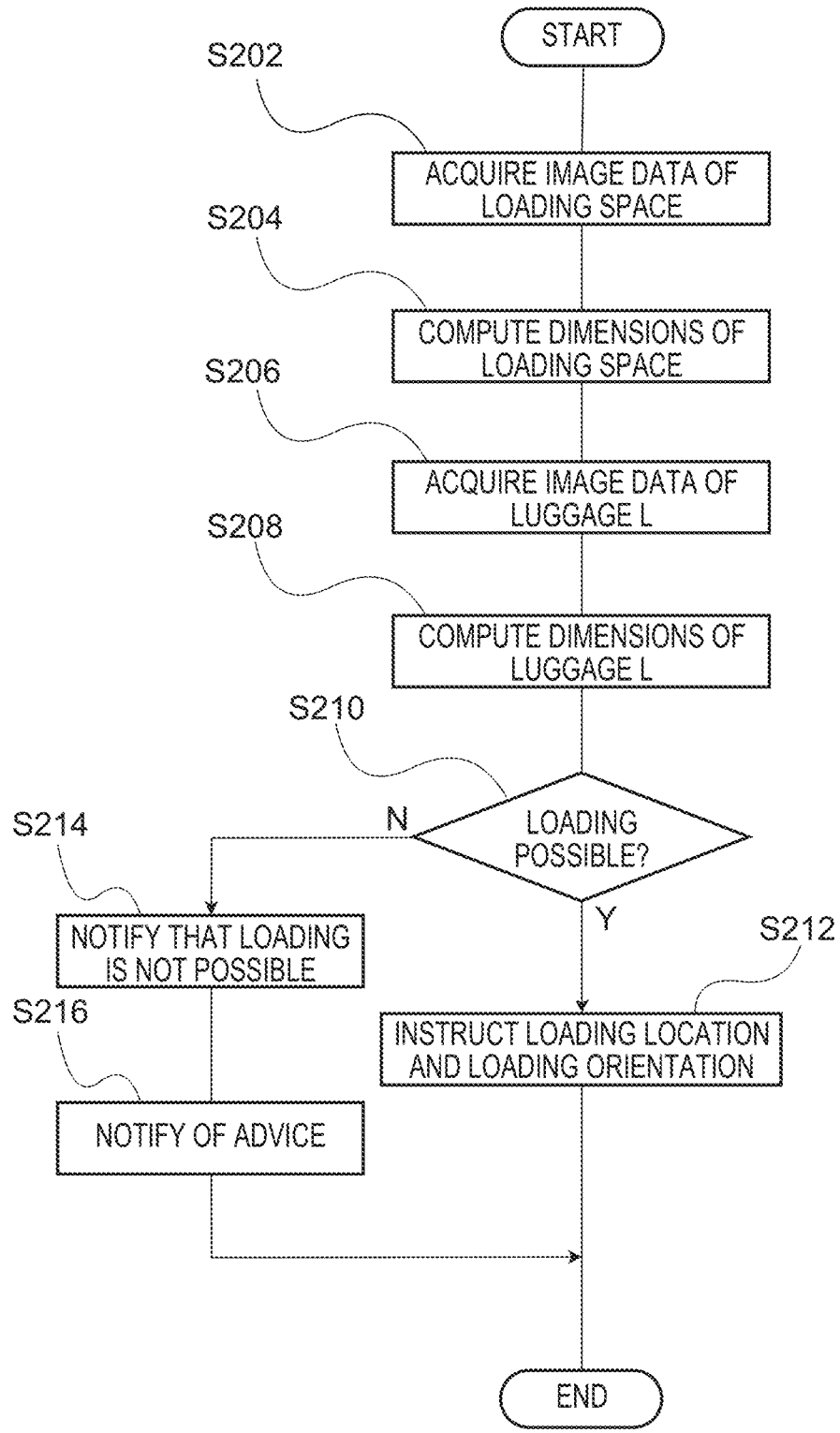
FIG. 8 is a flowchart illustrating an example of a flow of loading determination processing of the second exemplary embodiment.

Explanation follows regarding an example of loading determination processing to determine whether or not loading of luggage is possible, with reference to the flowchart illustrated in FIG. 8. This loading determination processing is executed by the CPU 16 reading the program from the ROM 18 or the storage 22, and expanding and executing the program in the RAM 20.

As illustrated in FIG. 8, at step S202, the CPU 16 acquires image data of the loading space. Specifically, using the functionality of the loading space image acquisition section 52, the CPU 16 guides the user to take a photograph of the loading space using the camera 36, and acquires the captured image data as image data of the loading space (see FIG. 9).

The CPU 16 then computes the dimensions of the loading space at step S204. Specifically, the CPU 16 computes the dimensions of the loading space based on the image data of the loading space acquired at step S202 using the functionality of the loading space dimension computation section 54 (a loading space dimension acquisition step). Note that since the luggage LA is already loaded into the loading space in FIG. 9, the CPU 16 computes the dimensions of the loading space from which the dimensions of the luggage LA have been subtracted. The CPU 16 then transitions to the processing of step S206.

At step S206, the CPU 16 acquires image data of the luggage L (a luggage image acquisition step). Specifically, using the functionality of the luggage image acquisition section 42, the CPU 16 guides the user to take a photograph of the luggage to be loaded using the camera 36, and acquires the captured image data as the image data of the luggage L to be loaded (see FIG. 5).

The CPU 16 then computes the dimensions of the luggage L at step S208 (a luggage dimension computation step). Specifically, the CPU 16 computes the dimensions of the luggage L based on the image data of the luggage L acquired at step S206 using the functionality of the luggage dimension computation section 44. The CPU 16 then transitions to the processing of step S210.

At step S210, the CPU 16 determines whether or not it is possible to load the luggage L into the loading space (a determination step). Specifically, determination is made as to whether or not it is possible to load the luggage L into the loading space by comparing the dimensions of the loading space computed at step S204 against the dimensions of the luggage L computed at step S208, using the functionality of the determination section 46.

In a case in which determination is made that loading of the luggage L is possible at step S210, the CPU 16 transitions to the processing of step S212. In a case in which determination is made that the luggage L cannot be loaded, the CPU 16 transitions to the processing of step S214.

At step S212, the CPU 16 instructs the loading location and loading orientation of the luggage L. Specifically, the CPU 16 displays the image data of the luggage L on the display screen 30 of the portable terminal 12 in a state overlaid on an image of the loading space of the vehicle using the functionality of the instruction section 48 in order to instruct the loading location and loading orientation of the luggage L. The CPU 16 then ends the loading determination processing.

In a case in which the luggage L cannot be loaded, the CPU 16 notifies that loading is not possible at step S214. Specifically, the CPU 16 notifies the user by displaying text to the effect that loading cannot be performed on the display screen 30 of the portable terminal 12. Note that the CPU 16 may display a symbol such as a cross mark on the display screen 30 so as to make it apparent at a glance that loading cannot be performed. Alternatively, the user may be notified using audio to the effect that loading cannot be performed, or audio notification may be performed alongside display on the display screen 30. The CPU 16 then ends the loading determination processing.

As described above, in the loading determination system 50 according to the present exemplary embodiment, the dimensions of the loading space can be acquired simply by taking a photograph of the loading space using the camera 36. Vehicle information is therefore not required during acquisition of the dimensions of the loading space. Namely, the dimensions of the loading space can be acquired easily even in a case in which the vehicle information is unknown, for example when using a rental vehicle.

Moreover, in the present exemplary embodiment, determination can be easily made as to whether or not it is possible to load the luggage L to be loaded, even in a case in which the luggage LA has been previously loaded into the loading space of the vehicle. Other operation is similar to that of the first exemplary embodiment.

Although explanation has been given regarding the loading determination system 10 according to the first exemplary embodiment and the loading determination system 50 according to the second exemplary embodiment, obviously various implementations are possible within a range not departing from the spirit of the present disclosure. For example, although the exemplary embodiments described above employ an application installed in the portable terminal 12 to make a determination, there is no limitation thereto. For example, a program may be held in storage configuring an electronic control unit (ECU) of the vehicle, such that determination is made by the ECU. In such cases, for example, information relating to the dimensions of the loading space of the vehicle may be stored in advance in the ECU storage. Alternatively, a configuration in which the user transmits image data of the luggage L captured using the camera 36 of the portable terminal 12 to the ECU via the communication interface 24 or the like would enable the ECU to compare the dimensions of the luggage L against the dimensions of the loading space.

Moreover, although the camera 36 of the portable terminal 12 is employed as an image capture device to acquire image data of the luggage, image data of the loading space, and the like in the exemplary embodiments described above, there is no limitation thereto. For example, a dedicated optical camera for dimensional measurements may be employed.

The loading determination processing executed by the CPU 16 reading a program in the above exemplary embodiments may be executed by various processors other than the CPU 16. Examples of such processors include programmable logic devices (PLDs) such as field-programmable gate arrays (FPGAs) that have a circuit configuration that can be modified post-manufacture, or dedicated electrical circuits, these being processors such as application specific integrated circuits (ASICs) that have a custom designed circuit configuration to execute specific processing. The loading determination processing may be executed using one of these processors, or may be executed by a combination of two or more processors of the same type or different types to each other (for example a combination of plural FPGAs, or a combination of a CPU and an FPGA). A more specific example of a hardware structure of these various processors is electric circuitry combining circuit elements such as semiconductor elements.

Moreover, although various data is stored in the storage 22 in the above exemplary embodiments, there is no limitation thereto. For example, a storage section may be configured by a non-transitory recording medium such as a compact disk (CD), a digital versatile disk (DVD), or universal serial bus (USB) memory. In such cases, various programs, data, and the like may be held in the non-transitory recording medium and executed by a processor such as the CPU 16.

What is claimed is:

1. A loading determination system comprising:
   a memory; and
   a processor coupled to the memory,
   the processor being configured to
      acquire a dimension of a loading space in a vehicle,
      acquire image data of luggage to be loaded,
      compute a dimension of the luggage based on the acquired image data,
      determine whether or not loading of the luggage into the loading space is possible by comparing the acquired dimension of the loading space with the computed dimension of the luggage, and
      acquire the dimension of the loading space from captured image data of the loading space.

2. The loading determination system of claim 1, wherein the processor is further configured to acquire the dimension of the loading space that has been stored in advance by vehicle type.

3. The loading determination system of claim 1, wherein, in a case in which luggage has already been loaded into the loading space, the processor is further configured to acquire the dimension of the loading space taking the already-loaded luggage into consideration.

4. The loading determination system of claim 1, wherein the processor is further configured to instruct a user of a loading location and a loading orientation of the luggage.

5. A loading determination method comprising, by a processor:
   acquiring a dimension of a loading space in a vehicle;
   acquiring image data of luggage to be loaded;
   computing a dimension of the luggage based on the acquired image data;
   determining whether or not loading of the luggage into the loading space is possible by comparing the acquired dimension of the loading space with the computed dimension of the luggage; and
   acquiring the dimension of the loading space from captured image data of the loading space.

6. The loading determination method of claim 5, further comprising, by the processor:
   acquiring the dimension of the loading space that has been stored in advance by vehicle type.

7. The loading determination method of claim 5, further comprising, by the processor:
   in a case in which luggage has already been loaded into the loading space, acquiring the dimension of the loading space taking the already-loaded luggage into consideration.

8. The loading determination method of claim 5, further comprising, by the processor:
   instructing a user of a loading location and a loading orientation of the luggage.

9. A non-transitory storage medium that stores a program that causes a processor to execute loading determination processing, the loading determination processing comprising:
   acquiring a dimension of a loading space in a vehicle;
   acquiring image data of luggage to be loaded;
   computing a dimension of the luggage based on the acquired image data;
   determining whether or not loading of the luggage into the loading space is possible by comparing the acquired dimension of the loading space with the computed dimension of the luggage; and
   acquiring the dimension of the loading space from captured image data of the loading space.

10. The non-transitory storage medium of claim 9, the loading determination processing further comprising:
acquiring the dimension of the loading space that has been stored in advance by vehicle type.

11. The non-transitory storage medium of claim 9, the loading determination processing further comprising:
in a case in which luggage has already been loaded into the loading space, acquiring the dimension of the loading space taking the already-loaded luggage into consideration.

12. The non-transitory storage medium of claim 9, the loading determination processing further comprising:
instructing a user of a loading location and a loading orientation of the luggage.

* * * * *